United States Patent
Bessette et al.

(10) Patent No.: US 7,055,553 B2
(45) Date of Patent: Jun. 6, 2006

(54) LAMINATED HOSE CONSTRUCTION HAVING ONE OR MORE INTERMEDIATE METAL BARRIER LAYERS

(75) Inventors: Arthur J. Bessette, Belchertown, MA (US); Mark D. Buddington, Hampden, MA (US)

(73) Assignee: Titeflex Corporation, Springfield, MA (US)

( * ) Notice: Subject to any disclaimer, the term of this patent is extended or adjusted under 35 U.S.C. 154(b) by 272 days.

(21) Appl. No.: 10/785,318

(22) Filed: Feb. 23, 2004

(65) Prior Publication Data

US 2004/0182463 A1    Sep. 23, 2004

Related U.S. Application Data

(60) Provisional application No. 60/450,367, filed on Feb. 27, 2003.

(51) Int. Cl.
*F16L 9/14* (2006.01)
(52) U.S. Cl. .................. 138/141; 138/133; 138/138; 138/143
(58) Field of Classification Search ............. 138/124, 138/125, 127, 133, 138, 143, DIG. 10, DIG. 7; 428/36.91
See application file for complete search history.

(56) References Cited

U.S. PATENT DOCUMENTS

| | | | |
|---|---|---|---|
| 2,783,173 A | 2/1957 | Walker et al. ........ 138/144 X |
| 3,023,787 A | 3/1962 | Phillips et al. ............ 138/121 |
| 4,406,142 A | 9/1983 | Kelstrom et al. ............ 72/98 |
| 5,124,878 A | 6/1992 | Martucci ............. 138/125 |
| 5,142,782 A | 9/1992 | Martucci ............. 138/125 X |
| 5,182,922 A | 2/1993 | Allread et al. ............. 62/239 |
| 5,271,977 A * | 12/1993 | Yoshikawa et al. ...... 428/35.9 |
| 5,398,729 A | 3/1995 | Spurgat .............. 138/133 |
| 5,401,334 A | 3/1995 | O'Melia et al. ........... 148/265 |
| 5,476,121 A * | 12/1995 | Yoshikawa et al. ........ 138/138 |
| 5,531,841 A | 7/1996 | O'Melia et al. ........... 148/265 |
| 5,638,871 A * | 6/1997 | Iorio et al. ............. 138/146 |
| 5,660,899 A * | 8/1997 | Rockney et al. .......... 428/34.7 |
| 5,718,956 A * | 2/1998 | Gladfelter et al. ........ 428/35.9 |
| 6,074,717 A * | 6/2000 | Little et al. .............. 428/35.7 |
| 6,176,268 B1 | 1/2001 | Hsich et al. ............. 138/137 |
| 6,192,942 B1 | 2/2001 | Hsich et al. ............. 138/137 |
| 6,209,587 B1 | 4/2001 | Hsich et al. ............. 138/137 |
| 6,257,280 B1 | 7/2001 | Marena ................ 138/125 |
| 6,263,920 B1 | 7/2001 | Hsich et al. ............. 138/137 |
| 6,276,400 B1 * | 8/2001 | Jackson et al. ........... 138/143 |
| 6,619,330 B1 * | 9/2003 | Ito et al. ................. 138/137 |
| 6,652,939 B1 * | 11/2003 | Smith et al. ............. 428/35.9 |
| 6,740,375 B1 | 5/2004 | Sagisaka et al. .......... 428/35.7 |
| 6,849,314 B1 * | 2/2005 | Jing et al. .............. 428/36.91 |
| 2003/0127147 A1 * | 7/2003 | Van Dam et al. .......... 138/127 |

* cited by examiner

OTHER PUBLICATIONS

ContiTech advertisement entitled "ContiTech at the 2003 International Motor Show (IAA) Passenger Cars" posted on http://www.contitech.de/ct/contitech/allgemein/news/2003_08_02_e_fl.html.

*Primary Examiner*—Patrick Brinson
(74) *Attorney, Agent, or Firm*—Holland & Bonzagni, P.C.; Mary R. Bonzagni, Esq.

(57) ABSTRACT

A laminated fluid transfer hose construction having one or more intermediate metal barrier layers is provided, as well as, a hose assembly employing the laminated hose construction and coupling means. The inventive hose construction demonstrates improved barrier properties in the form of improved fluid permeation resistance, as well as improved durability. The hose construction may be convoluted yet still provide exceptional resistance to undesirable buckling, kinking and fatigue with no increase in fluid permeation due to necessary "thinning" of the walls to produce "flex."

21 Claims, 2 Drawing Sheets

LAMINATED HOSE CONSTRUCTION HAVING ONE OR MORE INTERMEDIATE METAL BARRIER LAYERS

RELATED APPLICATION

This application claims priority from U.S. Provisional Patent Application Ser. No. 60/450,367, filed Feb. 27, 2003.

FIELD OF THE INVENTION

The subject invention relates generally to a laminated fluid transfer hose construction having one or more intermediate metal barrier layers. The inventive hose construction demonstrates improved barrier properties in the form of improved fluid permeation resistance, as well as improved durability.

BACKGROUND OF THE INVENTION

Fluid transfer hose products that are used in numerous applications to convey media that may be corrosive, caustic, or food grade, are typically exposed to a variety of deleterious and harmful conditions including extreme pressures, temperatures and flexing. The types of media being conveyed and the conditions to which the hose product will be exposed have led to the design of hose products having multiple layers. The materials of each layer have specific, and preferably complementary properties. Inner layers, for example, are typically designed to be chemically inert and resistant to permeation by liquids and gases, while outer layers possess mechanical strength and shock and abrasion resistance.

Due to the ever-increasing demands placed on fluid transfer hose products, continuous efforts directed toward improving the properties of these products have been undertaken by the hose industry.

Prior art attempts to reduce permeation in multi-layer smooth bore hose assemblies having one or more fluoropolymer layers include increasing wall thicknesses, using higher grade polymers, and processing polymers to have increased crystallinity. Unfortunately, increasing the wall thickness decreases the flexibility of the finished product as well as increasing its weight and cost. Using higher-grade polymers also increases the cost of the finished product, while increasing crystallinity increases the flexural modulus of the material thus decreasing the flexibility and reducing flex life.

Moreover, producing convoluted or corrugated hose constructions for applications requiring higher levels of flexibility in addition to permeation resistance has proven very difficult. Indeed, it has been commonly held that many convoluted hose constructions would not be suitable for such applications because the "thinning" of the walls to produce "flex" was expected to result in increased permeation to fluids.

A need therefore exists for a fluid transfer hose construction having improved barrier properties.

It is therefore a primary object of the present invention to provide such a hose construction.

It is a more particular object to provide a laminated hose construction having one or more intermediate metal barrier layers that exhibits good bond strength between layers, improved barrier properties and improved durability.

It is yet a more particular object to provide a convoluted, laminated hose construction having one or more intermediate metal barrier layers that demonstrates higher levels of flexibility in addition to the above-noted properties.

SUMMARY

The present invention therefore provides a laminated fluid transfer hose construction having improved barrier properties and improved durability, which comprises:

(a) a heat and chemically resistant inner tube;
(b) at least one metal barrier layer bonded to an outer surface of the inner tube;
(c) at least one fluoropolymer tie-layer bonded to an outer surface of the metal layer(s); and
(d) at least one reinforcing layer bonded to an outer surface of the fluoropolymer tie-layer(s).

The present invention further provides a hose assembly comprising the above-referenced laminated hose construction and coupling means.

Other features and advantages of the invention will be apparent to one of ordinary skill from the following detailed description and accompanying drawings.

Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

Particular features of the disclosed invention are illustrated by reference to the accompanying drawings in which.

BEST MODE FOR CARRYING OUT THE INVENTION

By way of the present invention, it has been discovered that the advantages of metal and non-metal layers may be combined to produce a laminated hose construction that demonstrates improved barrier properties, as well as improved durability. In fact, the combination of these layers allows the hose construction of the present invention to match the permeation resistance demonstrated by prior art convoluted metal hose assemblies. More importantly, the inventive hose construction maintains its permeation resistance even when kinked, which is a tremendous improvement over metal hose assemblies, which are known to leak catastrophically upon kinking.

It has also been discovered that the present inventive hose construction may be convoluted yet still provide exceptional resistance to undesirable buckling, kinking and fatigue with no increase in fluid permeation due to necessary "thinning" of the walls to produce "flex." Indeed, the inventive hose maintains a low level of permeability regardless of whether the shape of the hose is smooth or convoluted.

Figure 1:
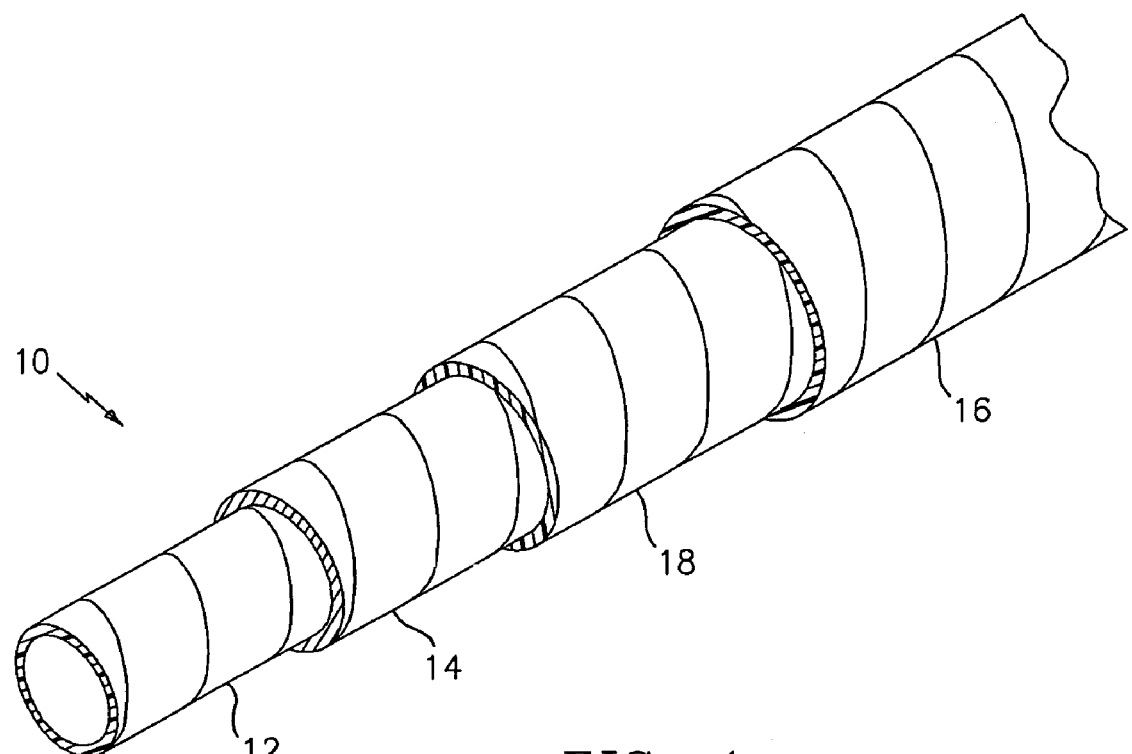
FIG. 1 is a partially broken away, perspective side view of a preferred embodiment of the laminated hose construction of the present invention in which the hose construction has a smooth bore.

A laminated hose construction made in accordance with a preferred embodiment of the present invention is shown generally at 10 in FIG. 1. The hose construction 10 includes a heat and chemically resistant inner tube 12, a metal barrier layer 14 disposed about the inner tube 12, a reinforcing layer 16, and a tie-layer 18 for adhering the metal barrier layer 14 to the reinforcing layer 16. Coupling means (not shown), adapted to engage the ends of the hose construction 10, may be included.

The heat and chemically resistant inner tube 12 of hose construction 10 can effectively accommodate a wide variety of aggressive or degrading fluids, such as refrigerants (e.g., fluorocarbons, carbon dioxide), brake fluids, hydraulic oils and fuels. Inner tube 12 can be made of any polymeric material that is extrudable or moldable and that has a compressive strength of from about 6.9 to about 34.5 megapascals (MPa). Such materials include fluorocarbon polymers, polyamides, polyethylene resins, polyesters, polyimides, polypropylene, polyvinylchloride, silicones, and mixtures thereof. Preferably, inner tube 12 is made of a fluorocarbon polymer such as PTFE, copolymers of tetrafluoroethylene and hexafluoropropylene (FEP), perfluoroalkoxyl resins (PFA) and polymers of ethylene-tetrafluoroethylene (ETFE). PTFE, FEP and PFA are sold by E.I. DuPont De Nemours, Inc., Wilmington, Del. ("DuPont"), under the trademark TEFLON. ETFE is also sold by DuPont under the trademark TEFZEL. More preferably, inner tube 12 is made of PTFE.

Inner tube 2 is preferably prepared using one or more fluoropolymer films or tapes that are applied to a cylindrical mandrel by either spirally or axially wrapping the tape about the mandrel. In some cases, both spiral and axial wrap may be used.

For spiral-wrap applications, the tape preferably has a width ranging from about 2.5 to about 11.4 centimeters (cm), a thickness ranging from about 0.1 to about 0.4 millimeters (mm), and is wrapped so as to achieve a degree of overlap ranging from about 10 to about 80%. Greater overlaps can also be used, but they are not usually necessary. In a more preferred embodiment, inner tube 12 is formed from about 1 to about 6 layers of spirally-wrapped tape.

In regard to axial-wrap applications, the tape preferably has a width ranging from about 5.1 to about 40.6 cm, a thickness ranging from about 0.1 to about 0.4 mm, and is wrapped so as to achieve a degree of overlap ranging from about 100 to about 600%. Again, greater overlaps can also be used, but they are not usually necessary.

Inner tube 12 preferably has a wall thickness ranging from about 0.10 to about 2.5 mm and an inner diameter ranging from about 3.8 to about 50 mm.

The inventive hose assembly 10 also includes at least one metal barrier layer 14 laminated to the outer surface of inner tube 12. Metal barrier layer(s) 14, which serves to reduce permeation of e.g. hydrocarbons through hose construction 10, is a continuous layer or layers that may be formed using aluminum, stainless steel, nickel, copper, brass, chrome, and/or corrosion-resistant alloys (e.g., HASTELLOY alloys, MONEL nickel-copper alloys).

In one embodiment, metal barrier layer 14 is a single-layer metal structure.

Preferably, metal barrier layer 14 is a single-layer aluminum structure prepared in accordance with the methods described in U.S. Pat. No. 5,401,334 to O'Melia et aL and U.S. Pat. No. 5,531,841 to O'Melia et aL More preferably, metal barrier layer 14 is prepared by applying a chromate conversion coating to a strip of aluminum foil having a width of from about 1.0 to about 10.3 cm and a thickness of from about 0.02 to about 0.18 mm. The conversion coated aluminum strip is then either axially or helically wrapped around inner tube 12. In yet a more preferred embodiment, the axially or helically wrapped aluminum foil strip is overlapped (e.g., 10 to 80% overlap for spiral or helically wrapped strips) to cover any gaps or leak paths in the aluminum foil layer thereby further reducing permeation through hose construction 10.

In another embodiment, metal barrier layer 14 is a multi-layered structure prepared using one or more metals.

Preferably, metal barrier layer 14 is a tri-layered aluminum/stainless steel/aluminum laminated structure.

More preferably, metal barrier layer 14 is prepared using an aluminum/stainless steel/aluminum laminated strip having a width of from about 2.5 to about 11.4 cm and a thickness of from about 0.1 to about 0.4 mm. The strip is coated on opposing sides with a chromate conversion coating and is then either axially or helically wrapped around the inner tube 12. The axially or helically wrapped laminated strip is preferably overlapped (e.g., 10 to 80% overlap for spiral or helically wrapped strips) to cover any gaps or leak paths in the aluminum/stainless steel/aluminum layer.

Metal barrier layer 14 preferably has a wall thickness ranging from about 0.05 to about 0.50 mm and an inner diameter ranging from about 3.8 to about 50 mm.

Tie-layer 18 serves to bond the metal barrier layer 14 to the reinforcing layer 16, thereby eliminating relative movement between these layers. Suitable materials for use in tie-layer 16 include fluoropolymer materials such as PTFE, FEP, PFA, and ETFE, with a preferred tie-layer material being PFA. It is noted that the use of PFA results in unexpectedly improved adhesive bond strength between the metal barrier layer 14 and the reinforcing layer 16.

In a more preferred embodiment of the present invention, a fluoropolymer clad metal film or tape is prepared by dispersing a fluoropolymer in a chromate conversion coating and then by applying the resulting mixture to a strip of metal foil. The prepared fluoropolymer clad metal film or tape is then used to simultaneously prepare metal barrier layer 14 and tie-layer 18. In a most preferred embodiment, a PFA clad aluminum film or tape is used to prepare these layers.

As will be described in more detail below, the improvement in adhesive bond strength between the PFA tie-layer 18 and the metal barrier and reinforcing layers 14, 16, has been found to be particularly surprising.

Tie-layer 18 preferably has a wall thickness ranging from about 0.01 to about 0.13 mm and an inner diameter ranging from about 3.8 to about 50 mm.

Hose construction 10 further comprises one or more reinforcing layers 16 prepared from reinforcing materials loosely or tightly braided, woven or wound about the exterior of tie-layer 18. Materials suitable for use in layer 16 include metal (e.g., carbon, carbon steel, copper, brass, stainless steel and alloys thereof) and non-metal (e.g., aramid, glass, nylon, polyester) reinforcing materials.

In a preferred embodiment, the material used for the reinforcing layer 16 is glass fiber such as fiberglass. Glass fibers provide the necessary strength needed to reinforce the hose construction and glass fibers are also heat resistant which is important for use in high temperature environments.

In another preferred embodiment, reinforcing layer 16 comprises an interwoven braid or a spiral winding of an aramid yarn. Aramid yarns or fibers are sold by DuPont, under the trade designation KEVLAR synthetic aramid fiber, and by Teijin Shoji (USA), 42 W 39$^{th}$ St. Fl. 6, New York, N.Y. 10018-3809, USA, under the trade designation TECHNORA para-aramid fiber.

Reinforcing layer 16 preferably has a wall thickness ranging from about 0.05 to about 0.80 mm and an inner diameter ranging from about 3.8 to about 50 mm.

Hose construction 10 of the present invention may include additional layers, which overlie the exterior surface of reinforcing layer 16. For example, in applications requiring abrasion resistance, hose construction 10 may further comprise a melt-extruded outer sleeve or jacket.

In a preferred process for preparing a preferred embodiment of hose construction 10, a fluoropolymer (e.g., PTFE) tape is applied to a cylindrical mandrel by spirally wrapping the tape about the mandrel to form an inner tube 12 having a wall thickness of from about 0.10 to about 2.5 mm and an inner diameter of from about 3.8 to about 50 mm. A fluoropolymer clad metal tape (e.g., a PFA clad aluminum tape) is then applied to the inner tube 12 by spirally wrapping the tape about the inner tube 12 to simultaneously form a metal barrier layer 14 having a wall thickness of from about 0.05 to about 0.50 mm and an inner diameter of from about 3.8 to about 50 mm, and a tie-layer 18 having a wall thickness of from about 0.01 to about 0.13 mm and an inner diameter of from about 3.8 to about 50 mm. A reinforcing material in the form of a tape (e.g., a fiberglass tape) is then applied to the tie-layer 18 by spirally wrapping the tape about the tie-layer 18 to form reinforcing layer 16 having a wall thickness of from about 0.05 to about 0.80 mm and an inner diameter of from about 3.8 to about 50 mm.

The wrapped assembly may then be at least partially corrugated using techniques commonly employed in the hose industry. For example, the wrapped assembly may be passed through a corrugating apparatus capable of making annular corrugations in the wrapped assembly on a continuous basis. Such an apparatus may include rotating helical internal and external forming dies and an internal stationary spline snubber that stops the tendency of the hose to rotate with the forming dies and compresses the convoluted shape. As is well known to those skilled in the art, during compression, the height of the convolution is increased which increases the outside diameter of the hose.

The smooth bore, or at least partially corrugated, wrapped assembly is then heated to a temperature ranging from about 37020 C. to about 400° C., preferably from about 385° C. to about 390° C. The purpose of the heating operation is to bond or fuse contiguous layers as well as the overlapping regions of the tapes, thereby forming an effective seal against fluid permeation along the length of the hose construction 10.

Figure 2:
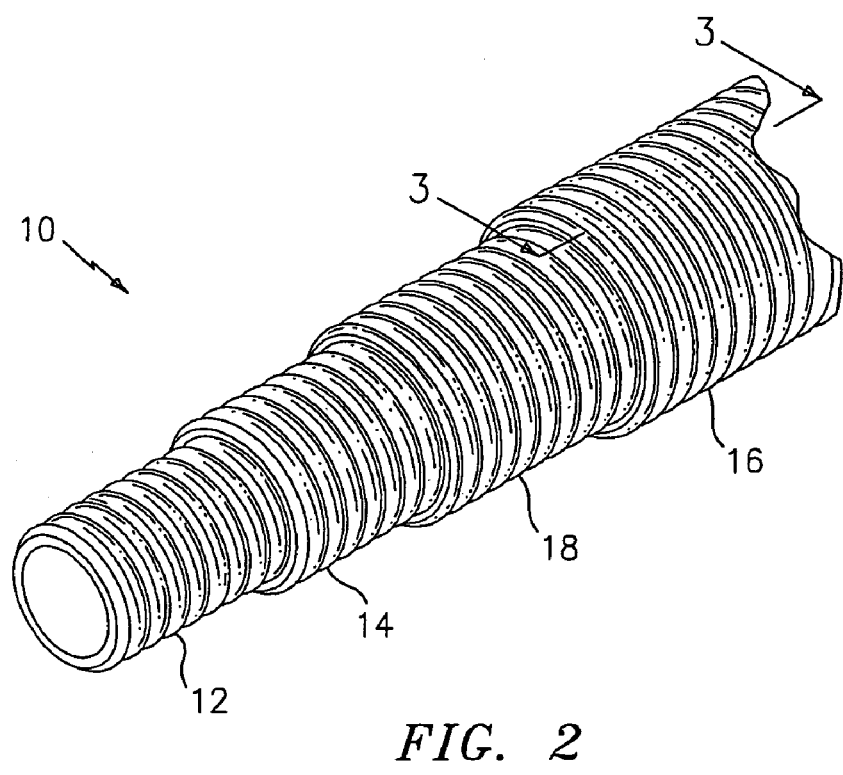
FIG. 2 is a partially broken away, perspective side view of a more preferred embodiment of the present invention in which the hose construction is corrugated or convoluted.
Figure 3:
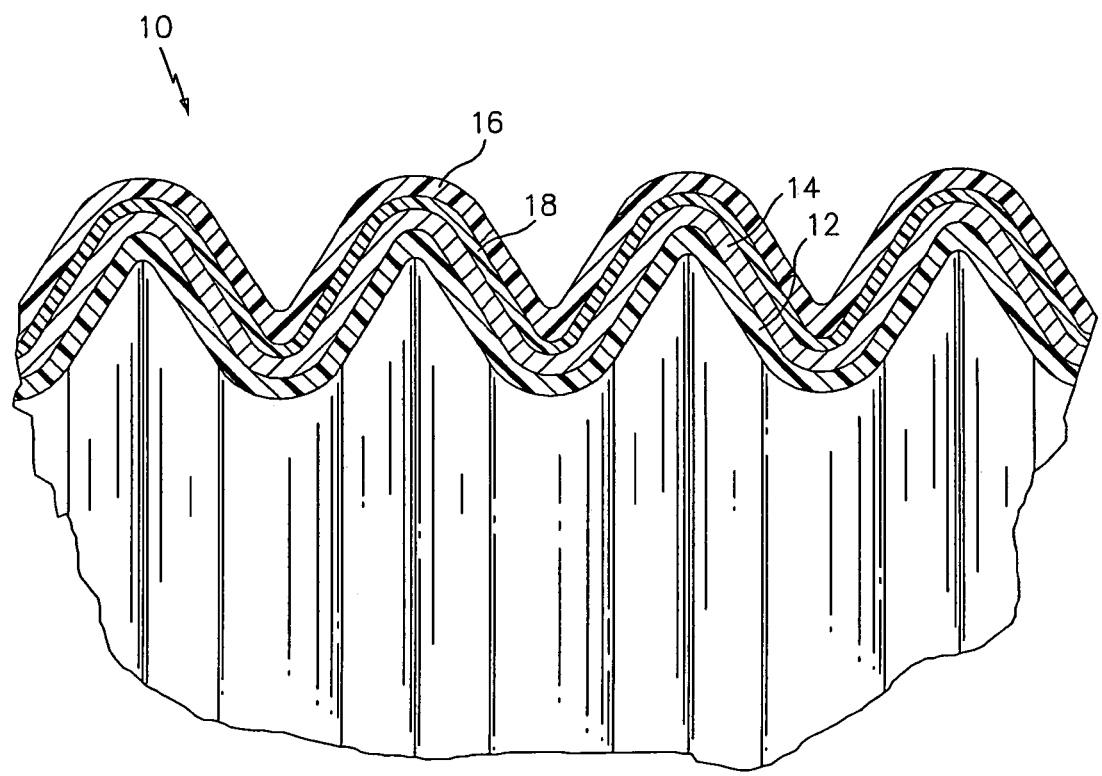
FIG. 3 is an enlarged, cross-sectional view of the more preferred embodiment of the inventive hose construction shown in FIG. 2, taken along lines 3—3.

In a most preferred embodiment, and as best shown in FIGS. 2 and 3, the inventive hose construction 10 is a convoluted and kink-resistant, laminated hose construction that comprises:

(a) a PTFE inner tube 12 formed by wrapping a PTFE film, in an overlapping fashion, along a portion or length of a cylindrical mandrel, wherein the PTFE film is substantially uniformly sealed to itself in overlapping regions along the length of the hose 10;

(b) an aluminum barrier layer 14; and (c) a PFA tie-layer 18, wherein, the aluminum barrier layer 14 and the PFA tie-layer 18 are formed by wrapping a PFA clad aluminum tape along a portion or length of the inner tube 12, wherein the PFA clad aluminum tape is substantially uniformly sealed to itself in overlapping regions and to inner tube 12 along the length of the hose 10; and (d) a fiberglass reinforcing layer 16, wherein the fiberglass reinforcing layer 16 is formed by wrapping a fiberglass tape, in an overlapping fashion, along a portion or length of the PFA tie-layer 18, wherein the fiberglass tape is substantially uniformly sealed to itself in overlapping regions and to the PFA tie-layer 18 along the length of the hose 10.

In this more preferred embodiment, hose construction 10 is flexible and hand formable and thus more versatile than smooth bore hose products. As a result, applications for its use continue to grow. For example, convoluted hose construction 10 may be used as a flexible refrigerant supply line, as a fuel hose, and as an instrument vibration isolation hose.

More importantly, the adhesive bond strength demonstrated by fiberglass reinforcing layer 16 when PFA is used to form tie-layer 18 is both surprising and unexpected. Specifically, preliminary test results indicate that the average peel strength demonstrated by fiberglass reinforcing layer 16 when PFA is used to form tie-layer 18 is greater than the average peel strength of layer 16 when PTFE is used to form tie-layer 18. In a preferred embodiment, the average peel strength between the metal barrier layer(s) and the reinforcing layer(s) of hose construction 10 is at least about 0.40 kilograms per centimeter (kg/cm), more preferably at least about 0.50 kg/cm.

The hose assembly of the present invention, which comprises hose construction 10 and coupling means, demonstrates a balance of physical properties in addition to improved permeation resistance. More specifically, the smooth bore embodiment of the inventive hose assembly demonstrates improved structural composite integrity when compared to prior art smooth bore PTFE hoses and metal hoses, while the convoluted embodiment of the inventive hose assembly further demonstrates improved flexibility; fatigue resistance and kink resistance when compared to prior art convoluted PTFE hoses and metal hoses.

In specific regard to permeation resistance, preliminary helium leak test results have indicated that the permeation resistance of the inventive hose assembly matches the permeation resistance demonstrated by prior art convoluted metal hose assemblies.

The invention is now described with reference to the following examples, which are for the purpose of illustration only and are not intended to imply any limitation on the scope of the invention.

WORKING EXAMPLES
Sample Preparation
Materials Used

| | |
|---|---|
| PTFE tape: | PTFE tape, 0.13 mm thick, available from DeWal Industries-USA, 15 Ray Trainor Drive, Saundertown, RI 02874 (DeWal). |
| Aluminum/ PFA tape: | Aluminum/PFA laminated tape measuring 2.54 cm in width and 0.13 mm in thickness, available from DeWal. |
| Fiberglass tape: | Fiberglass tape measuring 6.67 cm in width and 0.03 cm in thickness, available from DeWal. |

EXAMPLES 1 and 2

Two laminated structures were prepared to compare the average peel strength of fiberglass reinforcing layers when laminated to PFA and when laminated to PTFE.

For the first laminated structure, a length of the PTFE tape was trimmed, with the resulting tape measuring 2.5 cm in width and 12.7 cm in length. The trimmed PTFE tape was clamped at one end against a similarly sized Fiberglass tape with a transverse spring type paper clip. The clamping allowed about 2.5 cm of tape length under the area occupied by the clip.

For the second laminated structure, a length of the Aluminum/PFA tape was trimmed to 12.7 cm in length and clamped against a similarly sized Fiberglass tape, as described above, with the PFA layer located next to the Fiberglass tape layer.

The clamped samples were then placed in a conveyor oven, which had reached an internal temperature of 385° C., and held there for a period of fifteen minutes to sinter the clamped samples. The sintered samples were then allowed to cool.

EXAMPLES 3 to 6

Three sizes (−16 (3.15 cm Outer Diameter (OD), 2.54 cm Inner Diameter (ID)), −12 (2.57 cm OD, 1.99 cm ID), and −8 (1.87 cm OD, 1.35 cm ID)) of the inventive hose construction 10 were also prepared in an effort to evaluate permeation resistance. For this fabrication effort, three different sized cylindrical mandrels, having outer diameters measuring 1.43 cm, 2.16 cm, and 2.79 cm, were employed.

For each hose construction, a length of each of the following materials were spirally-wrapped in succession on a mandrel: a formable metal liner (PTFE coated aluminum liner, 4.45 cm wide, 0.01 cm thick), PTFE tape, Aluminum/PFA tape, Fiberglass tape. The resulting assembly with formable metal liner was then threaded between a helical outer and synchronized inner former of a KOPEX corrugating apparatus (model number KX50) to form corrugations. The resulting corrugated assembly was then heated to a temperature of 385° C. for 15 minutes to bond contiguous layers, as well as the overlapping regions of the tapes, thereby forming a corrugated composite structure having a thickness of 0.89 mm. The formable metal layer was then removed and a quantity of polyolefin heat shrink tubing was then positioned over each composite structure and heated with a hair dryer to form an outer protective layer or chafe sleeve having a thickness of 0.89 mm.

Each composite structure was then attached to end fittings.

EXAMPLES 7 to 9

Three sizes (−5 (0.75 cm OD, 0.47 cm ID), −8 (1.43 cm OD, 1.18 cm ID), and −12 (2.07 cm OD, 1.74 cm ID)) of a hose construction were also prepared in an effort to evaluate kink resistance. For this fabrication effort, PTFE cylindrical tubes having outer diameters of 0.75 cm, 1.43 cm, and 2.07 cm were employed.

A length of the Aluminum/PFA tape was spirally-wrapped on an outer surface of each PTFE tube, with the PFA layer facing the PTFE tube. The resulting assembly was then heated to a temperature of 385° C. for 15 minutes to bond contiguous layers, as well as the overlapping regions of the Aluminum/PFA tape, thereby forming a smooth bore composite structure. A quantity of polyolefin heat shrink tubing was then positioned over each composite structure and heated with a hair dryer to form an outer protective layer or chafe sleeve having a thickness of 0.89 mm.

Each composite structure was then attached to end fittings.

Test Methods

Peel Strength

For this test, the paper clip was removed from each laminated structure (Examples 1 and 2) and that portion of the Fiberglass layer that had been positioned under the paper clip was inserted into an upper jaw of an INSTRON Tensile Tester (model no. 4465). The opposing end of each laminated structure was then inserted into a lower jaw of the INSTRON Tensile Tester and the jaws activated. The samples were peeled at an angle of 180° and at a rate of 5.08 cm per minute, with the average peel strength of each laminated structure, which represents an average of seven readings, reported in kilograms per centimeter (kg/cm).

CE-10 Fuel Permeation Resistance

Fuel permeation rates were measured using micro-SHED (micro-Sealed Housing for Evaporative Determination), which is designed to measure hydrocarbon emissions using a flame ionization detector (FID). Details of the micro-SHED procedure and apparatus are described in Anders Aronsson and Marika Mannikko, "Micro SHED," SAE Technical Paper No. 980402 (1998). Example 3 was soaked in the CE-10 fuel for a three week period, while Example 4 was soaked in the CE-10 fuel for a ten week period. During the SHED test, the hose samples were vented through a fill plug to the outside of the SHED apparatus to minimize any effect of pressure. The temperature of the SHED test was set at 40° C. The results, which represent an average of two readings, are reported in milligrams hydrocarbon (HC) emissions in a 24 hour period.

R134A Refrigerant Permeation Resistance

Closed and sealed refrigeration systems, each consisting of a hose sample (Example 5), measuring 45.72 cm in length, a receiver (accumulator), and copper connectors, charged with approximately 1 liter of R134A refrigerant, were placed in a HOLMAN oven and maintained at a temperature of 80° C. for 24 days. Weight loss of each refrigeration system, hence gas leak, was measured and the average of three measurements per sample reported in grams 24 days.

Flexibility (Resistance to Embrittlement) under Extreme Temperature Fluctuation Hose samples (Example 6), measuring 121 cm in length, were placed in a HOLMAN oven, exposed to a temperature of 70° C. for 48 hours, and then placed in a Cincinatti Subzero Chamber and exposed to a temperature of −40° C. for another 48 hour period. The hose samples were then removed from the chamber, bent over a 10 cm radius or R block, and then pressurized to 69 bar with air. Each pressurized hose sample was then placed under water to check for leaks.

Kink Resistance

Hose samples (Examples 7 to 9), measuring 35.5 to 45.7 cm in length, were flexed by hand by bending the hose forward upon itself and then by bending the hose backward upon itself. The hose was then checked for kinks and pressurized to 20.7 bar with helium. The pressurized hose was then placed under water to check for leaks. The flexing of each hose sample and subsequent kink/leak checking was then repeated a total of five times.

EXAMPLES 1 and 2

In these examples, the prepared laminated structures were tested for average peel strength. The results are shown in Table 1 below.

TABLE 1

Summary of Examples 1 and 2

| Example | Laminate Structure | Average Peel Strength (kg/cm) |
|---|---|---|
| 1 | Aluminum/PFA/Fiberglass | 0.51 |
| 2 | PTFE/Fiberglass | 0.44 |

Examples 1 and 2 demonstrate that the average peel strength exhibited by the fiberglass reinforcing layer of the present invention when PFA is used to form the tie-layer is greater than the peel strength of the fiberglass reinforcing layer when PTFE is used to form the tie-layer.

EXAMPLES 3 to 9

In these examples, the prepared hose constructions were tested for permeation and kink resistance. The results are shown in Table 2 below.

TABLE 2

Summary of Examples 3 to 9

| Example | Hose Size | CE-10 Fuel Permeation Rate (mg/24 hrs) | R134A Refrigerant Permeation Rate (g/24 days) | Permeation Assistance Extreme Temperature Fluctuation | Kink Resistance |
|---|---|---|---|---|---|
| 3* | -16 | 0.06 | — | — | — |
| 4* | -16 | 0.065 | — | — | — |
| 5** | -8 | — | 0 | — | — |
| 6** | -12 | — | — | No leakage | — |
| 7*** | -5 | — | — | — | Initial flex cycle no kinks no leakage Subsequent flex cycles kinking no leakage |
| 8*** | -8 | — | — | — | Initial flex cycle no kinks no leakage Subsequent flex cycles kinking no leakage |
| 9*** | -12 | — | — | — | Initial flex cycle no kinks no leakage Subsequent flex cycles kinking no leakage |

*PTFE/Aluminum/PFA/Fiberglass/Polyolefin Chafe Sleeve
**PTFE/Aluminum/PFA/Fiberglass
***PTFE/PFA/Aluminum/Polyolefin Chafe Sleeve Examples 3 to 5 demonstrated ultra high resistance to fuel and refrigerant permeation. In particular, Examples 3 and 4 exhibited very low CE-10 fuel permeation rates, which were comparable to similarly sized metal hoses, while Example 5 had a zero permeation rate when tested with R134A refrigerant for 25 days at 80° C. Example 6 demonstrated no leakage when exposed to extreme temperature fluctuations, while Examples 7 to 9 exhibited exceptional kink resistance and exceptional permeation resistance even when kinked. The ability of the inventive hose construction to maintain its permeation resistance even when kinked is a vast improvement over metal hoses, which are known to leak catastrophically upon kinking.

While various embodiments of the present invention have been described above, it should be understood that they have been presented by way of example only, and not limitation. Thus, the breadth and scope of the present invention should not be limited by any of the exemplary embodiments.

The invention claimed is:

1. A laminated fluid transfer hose construction having improved barrier properties and improved durability, which comprises:
    (a) a heat and chemically resistant inner tube;
    (b) at least one metal barrier layer bonded to an outer surface of the inner tube;
    (c) at least one fluoropolymer tie-layer bonded to an outer surface of the metal layer(s); and
    (d) at least one reinforcing layer bonded to an outer surface of the fluoropolymer tie-layer(s).

2. The laminated fluid transfer hose construction of claim 1, wherein the heat and chemically resistant inner tube is prepared from a material selected from the group of fluorocarbon polymers, polyamides, polyethylene resins, polyesters, polyimides, polypropylene, polyvinylchloride, silicones, and mixtures thereof.

3. The laminated fluid transfer hose construction of claim 2, wherein the heat and chemically resistant inner tube is prepared from a fluorocarbon polymer selected from the group of polytetrafluoroethylene, copolymers of tetrafluoroethylene and hexafluoropropylene, perfluroalkoxyl resins, polymers of ethylene-tetrafluoroethylene, and mixtures thereof.

4. The laminated fluid transfer hose construction of claim 1, wherein the at least one metal barrier layer is prepared from a metal selected from the group of aluminum, stainless steel, nickel, copper, brass, chrome, and corrosion-resistant alloys.

5. The laminated fluid transfer hose construction of claim 4, wherein the at least one metal barrier layer is a single-layer metal structure.

6. The laminated fluid transfer hose construction of claim 5, wherein the single-layer metal structure comprises a chromate conversion coated aluminum single-layer metal structure.

7. The laminated fluid transfer hose construction of claim 4, wherein the at least one metal barrier layer is a multi-layered structure.

8. The laminated fluid transfer hose construction of claim 7, wherein the multi-layered structure is a laminated structure comprising a chromate conversion coated stainless steel layer located between two chromate conversion coated aluminum layers.

9. The laminated fluid transfer hose construction of claim 1, wherein the at least one fluoropolymer tie-layer is prepared from a fluoropolymer material selected from the group of polytetrafluoroethylene, copolymers of tetrafluoroethylene and hexafluoropropylene, perfluroalkoxyl resins and polymers of ethylene-tetrafluoroethylene.

10. The laminated fluid transfer hose construction of claim 9, wherein the fluoropolymer material is a perfluoroalkoxy resin.

11. The laminated fluid transfer hose construction of claim 10, wherein the average peel strength between the at least one metal barrier layer and the at least one reinforcing layer is at least about 0.40 kilogram per centimeter.

12. The laminated fluid transfer hose construction of claim 11, wherein the average peel strength between the at least one metal barrier layer and the at least one reinforcing layer is at least about 0.50 kilogram per centimeter.

13. The laminated fluid transfer hose construction of claim 1, wherein the at least one reinforcing layer is prepared from glass fibers.

14. The laminated fluid transfer hose construction of claim 1, wherein the at least one reinforcing layer is prepared from aramid yarns or fibers.

15. The laminated fluid transfer hose construction of claim 1, which further comprises an outer sleeve or jacket.

16. A laminated fluid transfer hose construction, which comprises:
 (a) an inner tube formed by wrapping a fluoropolymer film, in an overlapping fashion, along a portion or length of a cylindrical mandrel, wherein the fluoropolymer film is substantially uniformly sealed to itself in overlapping regions along the length of the hose;
 (b) an aluminum barrier layer; and
 (c) a fluoropolymer tie-layer,
 wherein, the aluminum barrier layer and the fluoropolymer tie-layer are formed by wrapping a fluoropolymer clad aluminum tape along a portion or length of the inner tube, wherein the fluoropolymer clad aluminum tape is substantially uniformly sealed to itself in overlapping regions and to inner tube along the length of the hose; and
 (d) a fiberglass reinforcing layer, wherein the fiberglass reinforcing layer is formed by wrapping a fiberglass tape, in an overlapping fashion, along a portion or length of the fluoropolymer tie-layer, wherein the fiberglass tape is substantially uniformly sealed to itself in overlapping regions and to the fluoropolymer tie-layer along the length of the hose.

17. The laminated fluid transfer hose construction of claim 16, wherein the fluoropolymer of the fluoropolymer tie-layer is a perfluoroalkoxy resin.

18. A hose assembly having improved barrier properties and improved durability, which comprises:
 (a) a laminated fluid transfer hose construction, which comprises:
  1. a heat and chemically resistant inner tube;
  2. at least one metal barrier layer bonded to an outer surface of the inner tube;
  3. at least one fluoropolymer tie-layer bonded to an outer surface of the metal layer(s); and
  4. at least one reinforcing layer bonded to an outer surface of the fluoropolymer tie-layer(s); and
 (b) coupling means.

19. The hose assembly of claim 18, wherein the fluoropolymer of the fluoropolymer tie-layer is a perfluoroalkoxy resin.

20. A hose assembly having improved barrier properties and improved durability, which comprises:
 (a) a laminated fluid transfer hose construction, which comprises:
  1. an inner tube formed by wrapping a fluoropolymer film, in an overlapping fashion, along a portion or length of a cylindrical mandrel, wherein the fluoropolymer film is substantially uniformly sealed to itself in overlapping regions along the length of the hose;
  2. an aluminum barrier layer; and
  3. a fluoropolymer tie-layer,
  wherein, the aluminum barrier layer and the fluoropolymer tie-layer are formed by wrapping a fluoropolymer clad aluminum tape along a portion or length of the inner tube, wherein the fluoropolymer clad aluminum tape is substantially uniformly sealed to itself in overlapping regions and to inner tube along the length of the hose; and
  4. a fiberglass reinforcing layer, wherein the fiberglass reinforcing layer is formed by wrapping a fiberglass tape, in an overlapping fashion, along a portion or length of the fluoropolymer tie-layer, wherein the fiberglass tape is substantially uniformly sealed to itself in overlapping regions and to the fluoropolymer tie-layer along the length of the hose; and
 (b) coupling means.

21. The hose assembly of claim 20, wherein the fluoropolymer of the fluoropolymer tie-layer is a perfluoroalkoxy resin.

* * * * *

UNITED STATES PATENT AND TRADEMARK OFFICE
CERTIFICATE OF CORRECTION

PATENT NO.        : 7,055,553 B2                                         Page 1 of 1
APPLICATION NO.   : 10/785318
DATED             : June 6, 2006
INVENTOR(S)       : Arthur J. Bessette et al.

It is certified that error appears in the above-identified patent and that said Letters Patent is hereby corrected as shown below:

Column 3, line 31 change "inner tube 2" to --Inner tube 12--.

Column 5, line 47 change "37020 C." to --320° C.--.

Column 8, line 43 change "grams" to --grams/--.

Signed and Sealed this

Twenty-second Day of August, 2006

JON W. DUDAS
*Director of the United States Patent and Trademark Office*